United States Patent [19]

Luthi

[11] 4,321,140

[45] Mar. 23, 1982

[54] DISK PRESS

[75] Inventor: Oscar Luthi, Nashua, N.H.

[73] Assignee: Ingersoll-Rand Company, Woodcliff Lake, N.J.

[21] Appl. No.: 192,899

[22] Filed: Oct. 1, 1980

[51] Int. Cl.³ ............................................. B01D 33/26
[52] U.S. Cl. ..................................... 210/327; 210/331
[58] Field of Search ............... 210/324, 325, 327, 330, 210/331, 396, 397, 415

[56] References Cited

U.S. PATENT DOCUMENTS

| | | | |
|---|---|---|---|
| 1,264,635 | 4/1918 | Graham | 210/331 |
| 1,446,448 | 2/1923 | Brown | 210/331 X |
| 2,592,972 | 4/1952 | Strassheim | 210/396 X |
| 3,735,873 | 5/1973 | Bergstedt | 210/415 |
| 4,139,467 | 2/1979 | Fritzvold | 210/397 |
| 4,207,190 | 1/1980 | Sheaffer | 210/331 X |

Primary Examiner—John Adee
Attorney, Agent, or Firm—Frank S. Troidl

[57] ABSTRACT

A pair of rotatable shafts are mounted within a housing. The shafts are spaced apart along the same plane with each shaft having a plurality of longitudinally spaced disks mounted thereon. The space between the shafts and the dimensions of the disks are such that disks on each shaft extend into the space between adjacent disks on the other shaft to provide pressing areas. One shaft is rotated clockwise; the other shaft is rotated counterclockwise.

A slurry or semi-solid is fed into the in-running sides of the disks. A cake forms on the disks by the flow of liquid through liquid passageways in the disks. Pressing to a high consistency takes place in the pressing areas. The cake thus formed is removed from the disks at the out-running sides of the disks.

5 Claims, 5 Drawing Figures

DISK PRESS

This invention relates to dewatering devices for dewatering slurries of pulp, sludge, peat moss, oil bearing seeds or other industrial or commercial products. More particularly, this invention is a new disk-type press.

In a typical municipal or industrial sewage treatment plant, the effluent is thickened by means of a settling thickener such as a flotation thickener to a consistency of approximately 4%. Further dewatering is done on a travelling wire vacuum filter or a centrifuge. The sludge will have a consistency of approximately 20% from the vacuum filter or centrifuge which is suitable for land fill. However, the sludge with the 20% consistency is too wet to be burned.

As is well known, present day goals are to conserve fuel and obtain additional fuel where possible. In general, however, it is necessary that a 30% or more discharge consistency from a dewatering device be obtained for autogenous combustion of the sludge. My new disk press provides the industry with a dewatering device which has at least a 30% discharge consistency. The actual consistency depends on the material. Peat moss will usually have a discharge consistency of 30%; other materials, such as pulp, will have a higher consistency. My disk press may be used either after a vacuum filter or a centrifuge to thicken the sludge from 20% to 30% or more, as desired. The vacuum filter or centrifuge may be eliminated and my new disk press used to directly dewater a 4% consistency sludge to a 30% or more discharge consistency.

If it is desired, for example, for washing purposes or sugar extraction, to have a low discharge consistency of say 4%, or less, an embodiment of my invention is described herein which will provide such low discharge consistency.

Briefly described, the disk press comprises a pair of rotatable shafts with the shafts spaced apart along the same plane. The space between the shafts and the dimensions of the longitudinally spaced disks on each shaft are such that disks on each shaft extend into the space between adjacent disks on the other shaft to provide cake pressing areas. One shaft is rotated clockwise and the other shaft counterclockwise. Means are provided for feeding the slurry into the space between the disks at the in-running side of the disks. A cake is formed on the disks and pressed to a high consistency in the pressing areas. The cake is removed from the disks at the out-running sides.

The invention as well as its many advantages may be further understood by references to the following detailed description and drawings in which.

In the various figures, like parts are referred to by like numbers.

Figure 2:
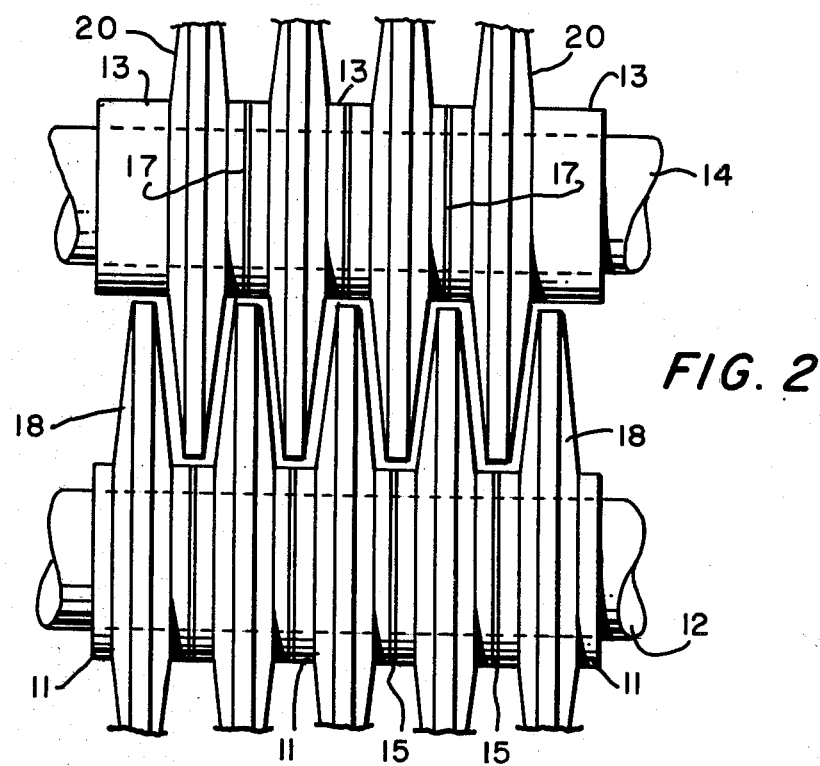
FIG. 2 is a top view showing the relative positions of the shafts and disks of the embodiment of FIG. 1.
Figure 1:
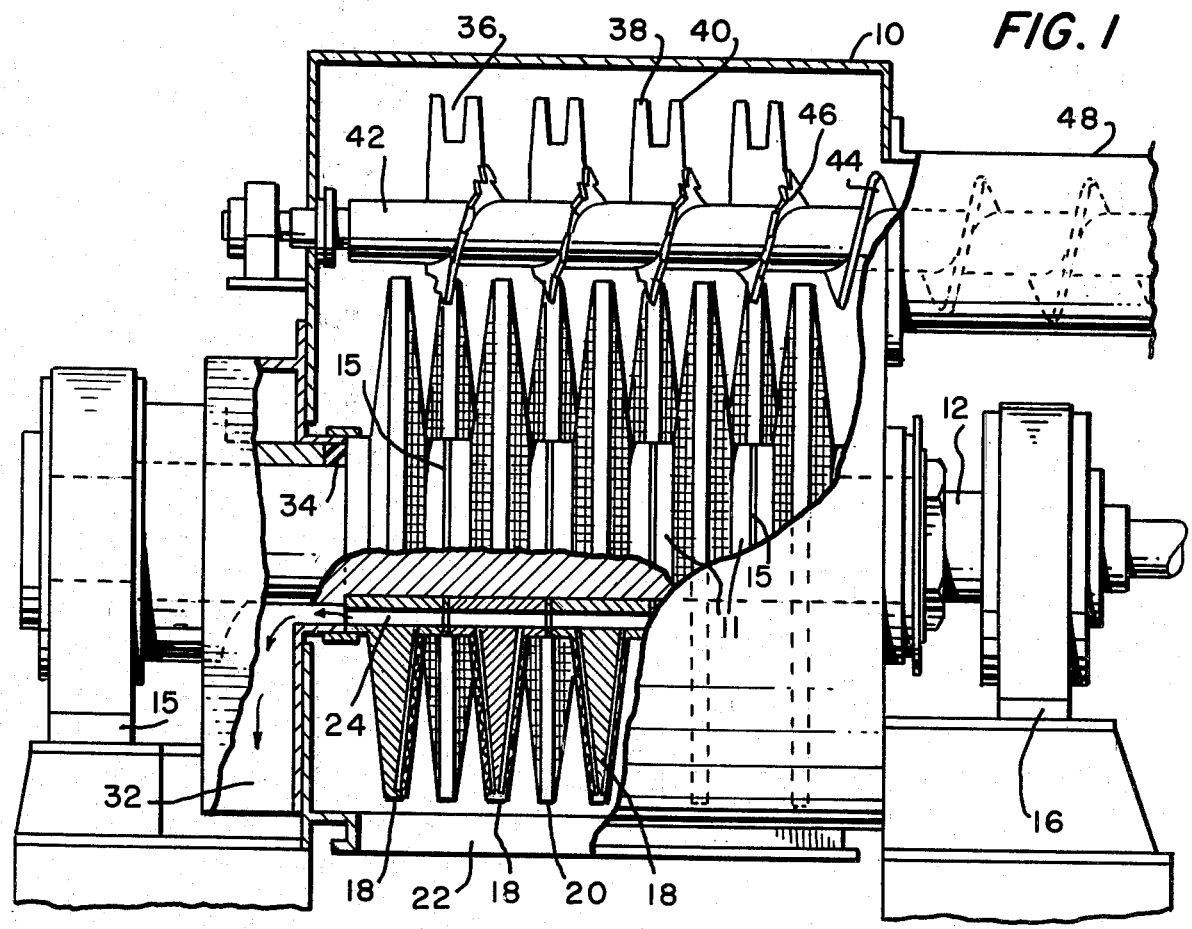
FIG. 1 is an elevational view, partly in section, showing one preferred embodiment of my invention.

Referring to the drawings and, more particularly, to FIG. 1, the disk press includes a housing 10. A pair of rotatable shafts 12 and 14 (see FIG. 2) are mounted for rotation on supports, such as supports 15 and 16 shown in FIG. 1. Though not shown, supports similar to supports 15 and 16 for rotatably supporting shaft 12 are also provided to rotatably support shaft 14.

A plurality of longitudinally spaced annular disk sectors 11 and 13 with conical disks 18 and 20, respectively, are mounted on rotatable shafts 12 and 14, respectively. Shims or spacers 15 and 17 separate annular disk sectors 11 and 13, respectively. Shafts 12 and 14 are horizontally spaced apart along the same horizontal plane. The shafts 12 and 14 and the disks 18 and 20 are located with respect to one another and dimensioned so that disks on each shaft extend into the space between adjacent disks on the other shaft. Thus, for example, looking at FIG. 2 it can be seen that the space between adjacent disks 18 on shaft 12 is such that each disk 20 on shaft 14 extends into the space between adjacent disks 18 to a point only slightly spaced from annular disk sectors 11 on shaft 12. Similarly, the space between adjacent disks 20 on shaft 14 is such that a disk 18 on shaft 12 extends into a space between adjacent disks 20 to a point only slightly spaced from annular disk sectors 13 on shaft 14. The overlapping portions of the disks provide pressing areas where cake formed on the disks is pressed to a higher consistency. The rate of convergence, and therefore, the amount of pressing is a function of the disk cone angle. A predetermined gap or space between the disks is set by means of shims or spacers 15 and 17. The spacing or gap may be changed, if desired, for example, if the material to be pressed is changed.

Figure 4:
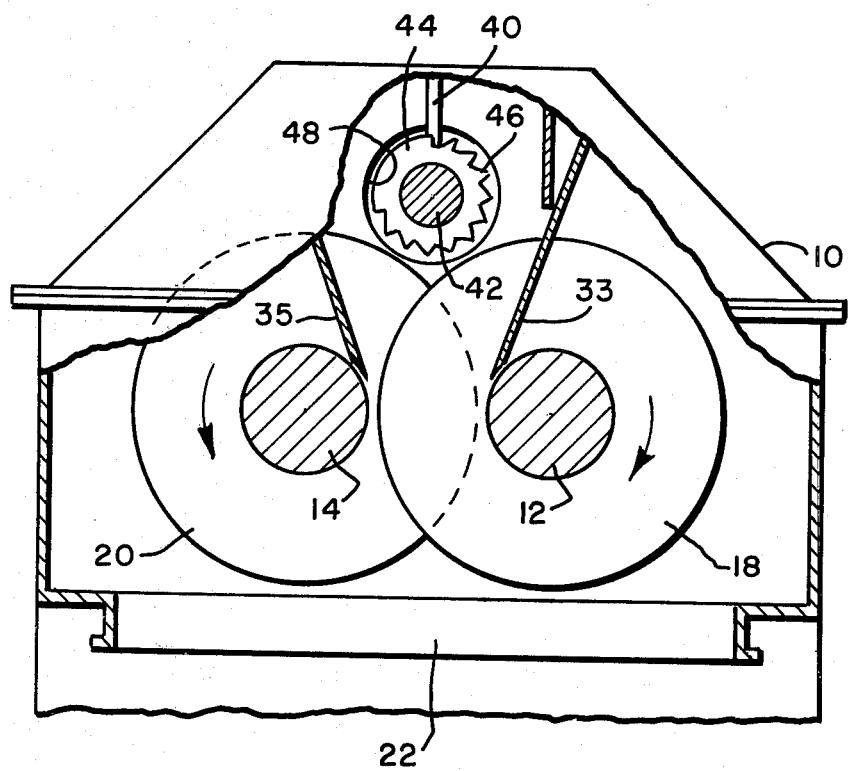
FIG. 4 is a transverse view, partly in section, of the embodiment of FIG. 1.

The slurry to be thickened or dewatered is fed into the housing 10 by means of slurry inlet 22 (see FIG. 1 and FIG. 4) located in the bottom of the housing 10. An important feature of my invention is that means are provided for rotating one shaft clockwise and the other shaft counterclockwise (see FIG. 4) and that the means for feeding the slurry into the housing is at the in-running sides of the disks. With this arrangement, a heavy cake of high consistency is formed on the disk cone surfaces in the pressing areas.

Figure 3:
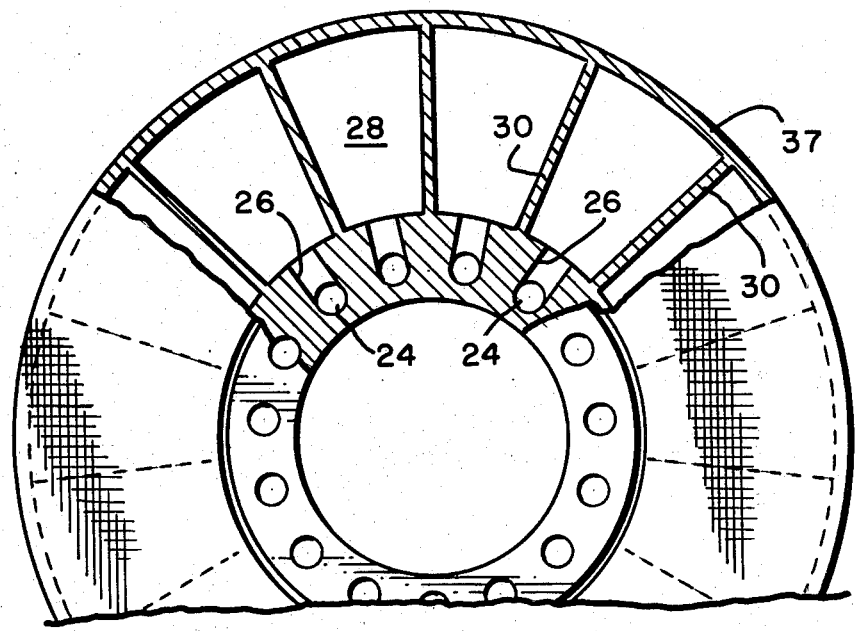
FIG. 3 is a fragmentary view, on an enlarged scale, of one of the disks.

Referring to FIG. 1 and FIG. 3, the annular disk sectors of each shaft such as shaft 12 have at least one and preferably a plurality of circumferentially equally spaced longitudinal shaft liquid passageways 24. A disk liquid passageway 26 (see FIG. 3) extends radially from each shaft liquid passageway 24 into channel sectors 28 formed by circumferentially spaced radial ribs 30 and annular rim 31.

With the application of a differential pressure across the disk's outer surface, such as by the use of a vacuum at the ends of the shafts, a large portion of the liquid content of the slurry flows through the outer side conical drainage surfaces of the disks, into the channel sectors 28, then through the disk liquid passageways 26, through the shaft liquid passageways 24 and then out of the housing through a filtrate outlet 32. As the liquid is removed from the slurry, a cake forms on the outside surfaces of the disks 18 and 20.

An adjustable valve means 34 (shown schematically in FIG. 1) controls the angle of rotation of the shafts during which liquid is withdrawn through the disk's outside surface. The valve 34 is arcuately shaped and covers a predetermined number of shaft liquid passageways 24 exits. The valve may be moved to, say, partially uncover one exit thereby helping to control the thickness of the cake.

Since the slurry is fed into housing 10 on the in-running side of the disks 18 and 20 and the sludge is removed from the housing at the out-running side of the rotating disks, the entire pressing area between adjacent disks is used to press the cake to a high consistency.

To remove the cake from the outside surfaces of the disks, longitudinally spaced sets of doctors 33 and 35 (only one doctor of each set shown in FIG. 4) extend angularly from the top of housing 10 into the spaces between disks 18 and between disks 20. Longitudinally spaced sets of fingers 36, each having two fingers, 38 and 40, are connected to screw conveyor 42 for rotation with the screw conveyor. Fingers 38 and 40 are spaced apart a predetermined distance and have a length such that the fingers rotate with the screw conveyor 42. They will, during part of their rotation, encompass the top outside surfaces of the disks 18 and 20 and help the doctors 33 and 35 remove the cake from such surfaces. A portion of the flight 44 of the screw conveyor has serrations 46 to break up and loosen the cake. The loose material is removed from the housing through sludge outlet 48.

In the operation of the embodiment of FIGS. 1 through 4, a slurry is fed to the housing 10 through inlet 22. A cake begins to form on the disks 18 and 20 on the lower portion of the disks and on the in-running side. After the cake reaches the pressing area, the cake is pressed to a high consistency in the pressing area. The high consistency cake is removed from the top of the disks at the out-running side by the doctors with the aid of the fingers. The resulting sludge having a high consistency of 30% or more is removed from the housing through sludge outlet 48 by means of the screw conveyor.

Sometimes, for example, for washing purposes or sugar extraction, a low consistency discharge of, say, around 4% consistency may be desired. The embodiment of FIG. 5 may be used to obtain a low consistency discharge.

Figure 5:
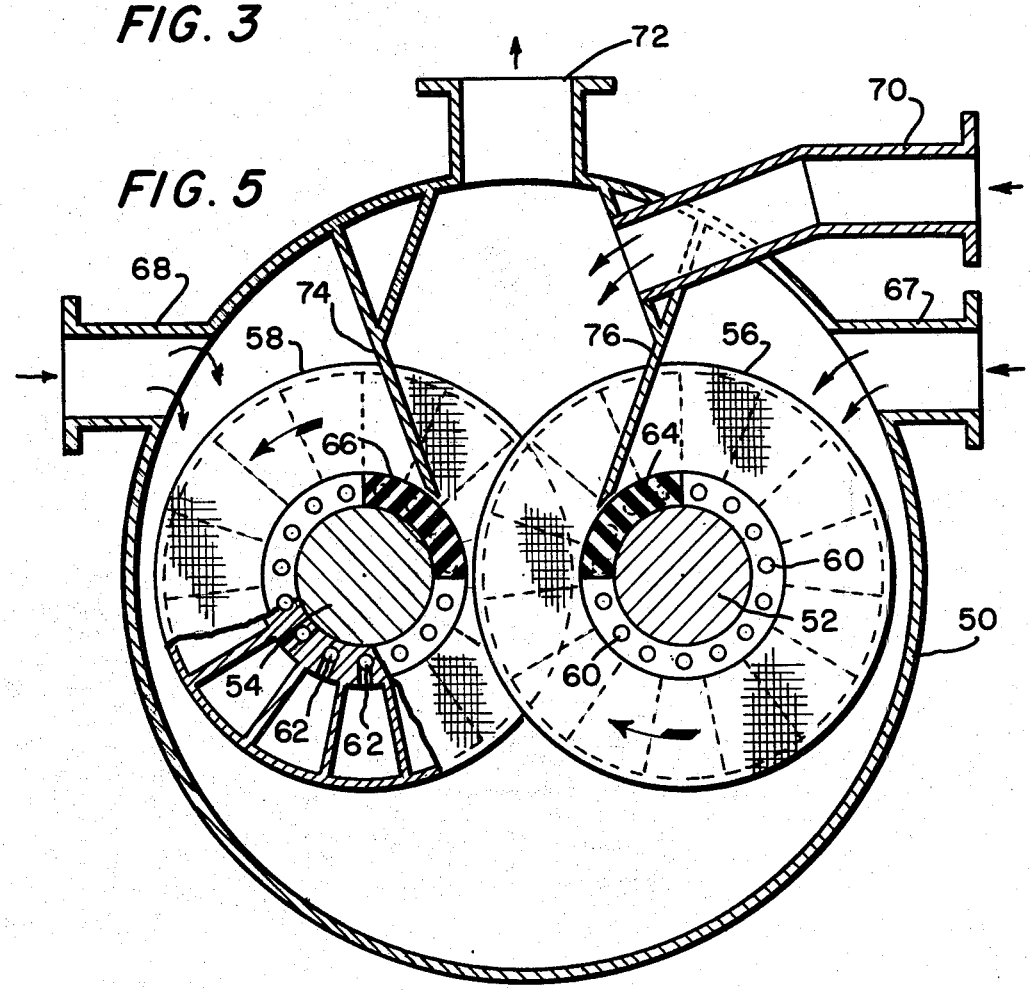
FIG. 5 is a schematic view, partly in section, showing a second preferred embodiment of my invention.

As shown schematically in FIG. 5, the disk press includes a housing 50 with a pair of separated rotatable shafts 52 and 54 which are separated along the same horizontal plane. Each rotatable shaft 52 and 54 has a plurality of separated disks 56 and 58, respectively. The disks 56 and 58 may be constructed similar to the disks of the embodiment of FIGS. 1 through 4. The shafts 52 and 54 include a plurality of shaft liquid passageways 60 and 62, respectively, with their exit openings controlled by adjustable valves 64 and 66, respectively. The slurry is fed to the housing by means of slurry inlets 67 and 68 which feed the slurry into the in-running side of the housing. As the slurry is fed into the housing, a cake forms on the disks and is pressed to a high consistency in the pressing area.

Since a low consistency discharge is required, a dilution liquid is fed through the dilution liquid inlet 70 into the top of the housing 50 at the out-running side of the disks. The low consistency slurry is removed from the housing through slurry outlet 72.

Doctors 74 and 76 remove the cake from the outside surfaces of disks 56 and 58 and prevent removed cake from re-entering the in-running side of the housing.

I claim:

1. A disk press comprising: a pair of rotatable shafts, said shafts being spaced apart along the same plane; a plurality of longitudinally-spaced disks mounted on each rotatable shaft, the space between the shafts and the dimensions of the disks being such that disks on each shaft extend into the space between adjacent disks on the other shaft to provide pressing areas; means for rotating one shaft clockwise and the other shaft counterclockwise; means for feeding wet material into the in-running sides of the disks; means for forming cakes on the in-running sides of disks; said cakes being pressed to a higher consistency in the pressing areas; and longitudinally-spaced sets of doctors extending into the spaces between the disks for removing the pressed cake from the disks at the out-running side of the disks, said doctors being constructed to provide separate in-running and out-running sides of the disks, and prevent removed cake from re-entering the in-running sides of the disks.

2. A disk press in accordance with claim 1 wherein the means for forming a cake on the disks comprises: at least one shaft liquid passageway extending lengthwise within each rotatable shaft; disk liquid passageway means in each disk extending from the shaft liquid passageway into the disks; and outer side surfaces on the disks structured to permit the flow of liquid through said outer side surfaces into the disk liquid passageway.

3. A disk press in accordance with claim 2 wherein there are a plurality of circumferentially, equally spaced shaft liquid passageways within each shaft, the disk liquid passageway means includes a plurality of radially extending ribs circumferentially spaced to provide a plurality of channel sectors with each channel sector being connected to a shaft liquid passageway; and an adjustable valve controls the angle of rotation of the shafts during which liquid is withdrawn from the housing, through the disk apertures, and through each channel sector and its associated shaft liquid passageway to thereby control the thickness of the cake.

4. A disk press in accordance with claim 1 wherein each disk is mounted on an annular disk sector and shims are provided about said shafts to longitudinally separate the annular disk sectors.

5. A disk press comprising: a housing; a pair of rotatable shafts mounted in said housing, said shafts being spaced apart along the same plane; a plurality of longitudinally-spaced disks mounted on each rotatable shaft, the space between the shafts and the dimensions of the disks being such that disks on each shaft extend into the space between adjacent disks on the other shaft to provide pressing areas; means for rotating one shaft clockwise and the other shaft counterclockwise; means for feeding a slurry into the housing at a location such that slurry enters the housing at the in-running sides of the disks; means for forming cakes on the in-running sides of the disks; said cakes being pressed to a higher consistency in the pressing areas; longitudinally-spaced sets of doctors extending into the spaces between the disks for removing the pressed cake from the disks at the out-running sides of the disks, said doctors being constructed to provide separate in-running and out-running sides of the disks, and prevent removed cake from re-entering the in-running side of the disks; and a dilution liquid inlet for flowing dilution liquid into the housing at the out-running sides of the disks to form a low consistency material suspension.

* * * * *